United States Patent
Kuppi et al.

(10) Patent No.: US 10,145,715 B2
(45) Date of Patent: Dec. 4, 2018

(54) ULTRASONIC FLOWMETER

(71) Applicant: SICK Engineering GmbH, Ottendorf-Okrilla (DE)

(72) Inventors: Heiko Kuppi, Waldkirch (DE); Gerry Schröter, Waldkirch (DE)

(73) Assignee: SICK ENGINEERING GMBH, Ottendorf-Okrilla (DE)

( * ) Notice: Subject to any disclaimer, the term of this patent is extended or adjusted under 35 U.S.C. 154(b) by 74 days.

(21) Appl. No.: 15/425,327

(22) Filed: Feb. 6, 2017

(65) Prior Publication Data
US 2017/0241819 A1 Aug. 24, 2017

(30) Foreign Application Priority Data
Feb. 24, 2016 (DE) .................. 10 2016 103 260

(51) Int. Cl.
*G01F 1/66* (2006.01)
*G01L 27/00* (2006.01)
*G01K 13/02* (2006.01)
*G01F 25/00* (2006.01)

(52) U.S. Cl.
CPC .............. *G01F 1/668* (2013.01); *G01F 1/66* (2013.01); *G01F 25/0007* (2013.01); *G01K 13/02* (2013.01); *G01L 27/00* (2013.01)

(58) Field of Classification Search
CPC ...... G01F 1/667; G01F 1/662; G01F 25/0007; G01F 1/66; G01F 1/668; G01N 2291/02872; G01N 29/222
See application file for complete search history.

(56) References Cited

U.S. PATENT DOCUMENTS

| | | | | |
|---|---|---|---|---|
| 4,476,707 A | | 10/1984 | Burns et al. | |
| 5,437,194 A | * | 8/1995 | Lynnworth | G01F 1/662 73/861.27 |
| 5,962,790 A | * | 10/1999 | Lynnworth | G01F 1/662 73/644 |
| 8,234,934 B2 | * | 8/2012 | Dietz | G01F 1/662 73/861.31 |
| 9,316,517 B2 | * | 4/2016 | Forbes | G01F 1/667 |
| 2004/0011141 A1 | * | 1/2004 | Lynnworth | G01F 1/662 73/861.27 |
| 2005/0000301 A1 | * | 1/2005 | Umekage | G01F 1/66 73/861.27 |
| 2005/0005709 A1 | * | 1/2005 | Schaffer | G01F 1/667 73/861 |

(Continued)

FOREIGN PATENT DOCUMENTS

| | | |
|---|---|---|
| DE | 202015006553 U1 | 11/2015 |
| EP | 1293759 B1 | 3/2006 |

OTHER PUBLICATIONS

German Office Action dated Nov. 11, 2016 corresponding to application No. 102016103260.3.

*Primary Examiner* — David A Rogers
(74) *Attorney, Agent, or Firm* — Nath, Goldberg & Meyer; Jerald L. Meyer

(57) ABSTRACT

An ultrasonic flowmeter for measuring the flow speed and/or the volumetric flow rate of a fluid includes a measurement sensor, at least two ultrasonic transducers, a pressure sensor, and a calibration connector. The ultrasonic flowmeter allows a simple and inexpensive calibration of the pressure sensor in the flowmeter.

8 Claims, 5 Drawing Sheets

(56) References Cited

U.S. PATENT DOCUMENTS

| | | | |
|---|---|---|---|
| 2005/0210999 A1* | 9/2005 | Sylvia | G01F 1/662 73/861.29 |
| 2009/0211330 A1* | 8/2009 | Froehlich | G01F 1/667 73/1.16 |
| 2010/0005901 A1* | 1/2010 | Groeschel | G01F 1/662 73/861.27 |
| 2010/0064821 A1* | 3/2010 | Nakabayashi | G01F 1/667 73/861.27 |
| 2013/0080080 A1* | 3/2013 | Forbes | G01F 1/667 702/48 |
| 2013/0253872 A1* | 9/2013 | Curtis | G01F 25/0007 702/100 |
| 2014/0103274 A1 | 4/2014 | McDonald et al. | |
| 2014/0109686 A1 | 4/2014 | Ramsay | |
| 2014/0345373 A1* | 11/2014 | Akita | G01F 9/00 73/114.52 |
| 2015/0198472 A1* | 7/2015 | Furlong | F15D 1/02 73/861.18 |

* cited by examiner

-- PRIOR ART --

ULTRASONIC FLOWMETER

TECHNICAL FIELD

The invention relates to an apparatus for measuring the flow speed and/or the volumetric flow rate of a fluid.

BACKGROUND OF THE INVENTION

In process volumetric flow rate metrology, ultrasonic transit time meters are inter alia used for the measurement of the volumetric flow rate. They essentially comprise a measurement sensor that comprises a pipe piece having welded connector flanges, the ultrasonic transducers, also called ultrasonic probes and inserted into the pipe piece (middle piece) of the measurement sensor, as well as a signal processing unit for controlling the ultrasonic probes and for processing the signals output by the probes.

The measurement principle comprises a detection of a transit time difference of two ultrasonic signals that are irradiated or received in a direction that has a component in the direction of flow, on the one hand, and a component against the direction of flow, on the other hand. The signals have to be transmitted or received at a specific angle not equal to 90° with respect to the flow axis for this purpose. An ultrasonic flowmeter in accordance with this principle is known from EP 1 293 759 B1.

An exact determination of the pressure and of the temperature of the fluid is necessary for the calculation of the energy content from the measured value of the volumetric flow rate. Pressure and temperature sensors therefore have to be regularly calibrated. This is done nowadays by the external attachment of pipelines and blocking elements, which is complex and/or expensive and has the consequence of increased space requirements. US 2014/0109686 A1 shows such a design, for example. There is furthermore the risk that the external attachments are damaged during transport. The external attachments are also exposed to the environmental conditions and thus have to satisfy increased demands on leaktightness (IP protection). The electrical lines of the sensors are furthermore conducted to an evaluation unit in a manner accessible from the outside. Additional measures have to be provided for their protection from environmental influences.

A flowmeter for drinking water that comprises a pressure sensor, but does not have to be calibrated is known from DE 20 2015 006 553 U1.

SUMMARY

Starting from this prior art, it is the object of the invention to provide an improved measurement apparatus with which the aforesaid disadvantages can be avoided and that in particular allows a simple, compact and inexpensive calibration of the pressure sensor.

This object is satisfied by an ultrasonic flowmeter having the features of claim 1.

An ultrasonic flowmeter in accordance with the invention for measuring the flow speed and/or the volumetric flow rate of a fluid comprises:
  a measurement sensor that has connector flanges for connecting pipelines for the fluid and that has a middle piece through which the fluid flows;
at least two ultrasonic transducers that are received in the middle piece, that form an ultrasonic transducer pair, and that span a measurement path between them that passes through the flow;
  a pressure sensor that is held in a pressure sensor mount in the middle piece and that is in fluid communication with the interior of the middle piece via a punch mount;
  a calibration connector that is held in a middle piece in a calibration connector mount and that is in fluid communication with the interior of the middle piece via the punch mount;
  wherein a punch can be brought into two positions in the punch mount and the pressure sensor is in fluid communication with the interior of the middle piece in a first position;
  and the pressure sensor is in fluid communication with the calibration connector via the punch mount in a second position.

A simple calibration of the pressure sensor has become possible using the measurement apparatus in accordance with the invention. For this purpose, the punch only has to be brought into its second position, whereby the pressure sensor is decoupled from the fluid flow and is simultaneously coupled to the calibration connector. A direction calibration can then take place by means of a device connected to the calibration connector. After calibration, the punch can again be brought into the first position, whereby the pressure sensor is decoupled from the calibration connector and is again connected to the fluid flow. In this embodiment, the mounts in the middle piece can be advantageously produced. This mechanism and the pressure sensor and the calibration connector are arranged sunk in the middle piece of the measurement sensor and can be closed by a cover. The protection of the device from environmental influences and the protection from mechanical damage are thus achieved.

For the same reasons, in a further development, the electrical connection lines are conducted to an evaluation unit arranged at the middle piece through corresponding bores through the wall of the middle piece and are not visible to the outside.

In a further development of the invention, the punch can be brought from one position into the other by rotation, which can take place in the simplest case by a thread that allows a screwing in and unscrewing of the punch.

In a further development of the invention, the longitudinal directions of the pressure sensor mount, of the calibration connector mount and of the punch mount are aligned at angles with respect to one another such that the pressure sensor mount and the calibration connector mount open into the punch mount and the punch mount opens into the interior of the middle piece, with the openings of the pressure sensor mount and of the calibration connector mount being disposed at different punch mount depths and the opening of the pressure sensor mount being disposed closer toward the interior.

Starting from this, it is advantageous if the punch is configured as sealing with respect to the punch mount at its end at the front side and disposed toward the interior of the middle piece. The stamp can then satisfy a plurality of functions on the movement from one position to the other. It is thus namely possible that the punch closes the access to the interior of the middle piece in the second position and simultaneously releases the connection between the pressure sensor and the calibration connector. On the movement of the punch from the second position into the first position, the access to the interior is first released and then the connection to the pressure sensor. The punch is then in the first position in which the end at the front side closes the connection between the pressure sensor and the calibration connector.

In an advantageous manner for the design, the punch is screwed from the first position to the second position via a thread by rotating toward the interior into the middle piece.

In addition, a temperature sensor can be held in a temperature sensor mount to detect the temperature of the fluid, with the temperature sensor mount also being able to be covered by a cover cap here.

BRIEF DESCRIPTION OF THE DRAWINGS

The invention will be explained in detail in the following with reference to an embodiment and to the drawing. There are shown in the drawing.

DETAILED DESCRIPTION

Figure 1:
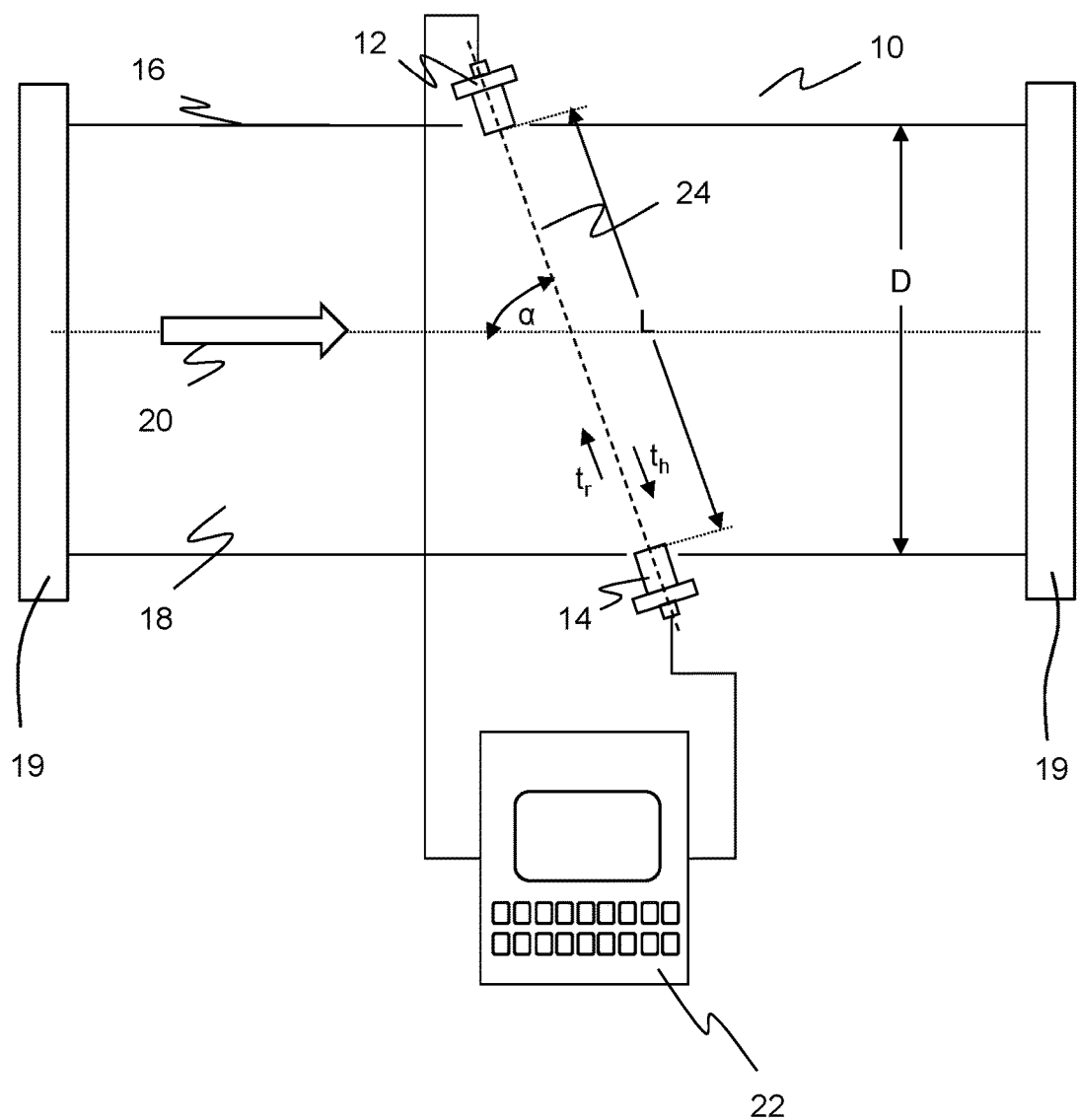
FIG. 1 a representation to illustrate the measurement principle of the meter in accordance with the invention.

The flowmeter 10 in accordance with the invention works in accordance with the known principle of measurement of the volumetric flow rate by means of ultrasound (see also EP 1 293 759 B1). This known measurement principle is shown in FIG. 1. The flowmeter 10 comprises at least two ultrasound transducers 12, 14 that are arranged at an angle α not equal to zero with respect to the flow direction 20 in the wall of a tubular middle piece 16 with a nominal width D in which a fluid 18 flows in the direction 20. The ultrasonic transducers 12, 14 work, controlled by a control and evaluation unit 22, alternately as transmitters and receivers. The ultrasonic signals propagating on a measurement path 24 through the fluid 18 experience an additional speed component in the one direction (from 12 to 14) through the flow and, on a propagation in the other direction (from 14 to 12), the speed component acts with the other sign, that is decelerating. The transit time of the ultrasound pulses moving to and fro on the measurement path 24 is therefore different due to the flow 20. The respective received signals are supplied to the control and evaluation unit 22, optionally by circuit elements, not shown, such as amplifiers and A/D converters, are shaped and are finally digitally evaluated. The resulting transit time difference in accordance with $$v = \frac{L}{(2\cos\alpha)}\left(\frac{1}{t_h} - \frac{1}{t_r}\right) \quad (1)$$

is offset with the sought flow speed or in accordance with $$\dot{Q} = v \frac{1}{4} D^2 \pi \quad (2)$$

with the volume flow in which the geometrical relationships are described as in FIG. 1 by the following variables:
v: flow speed of the fluid in the line;
L: length of the measurement path between the two ultrasonic transducers;
α: angle at which the ultrasonic transducers transmit and receive
Q: volume flow
D: diameter of the line;
$t_h$: transit time of the ultrasound with the flow; and
$t_r$: transit time of the ultrasound against the flow It is understood that the speed of sound of the through-flowing gas can also be determined using this arrangement in accordance with $$SoS = \frac{2L}{(t_h + t_r)}. \quad (3)$$

Figure 2:
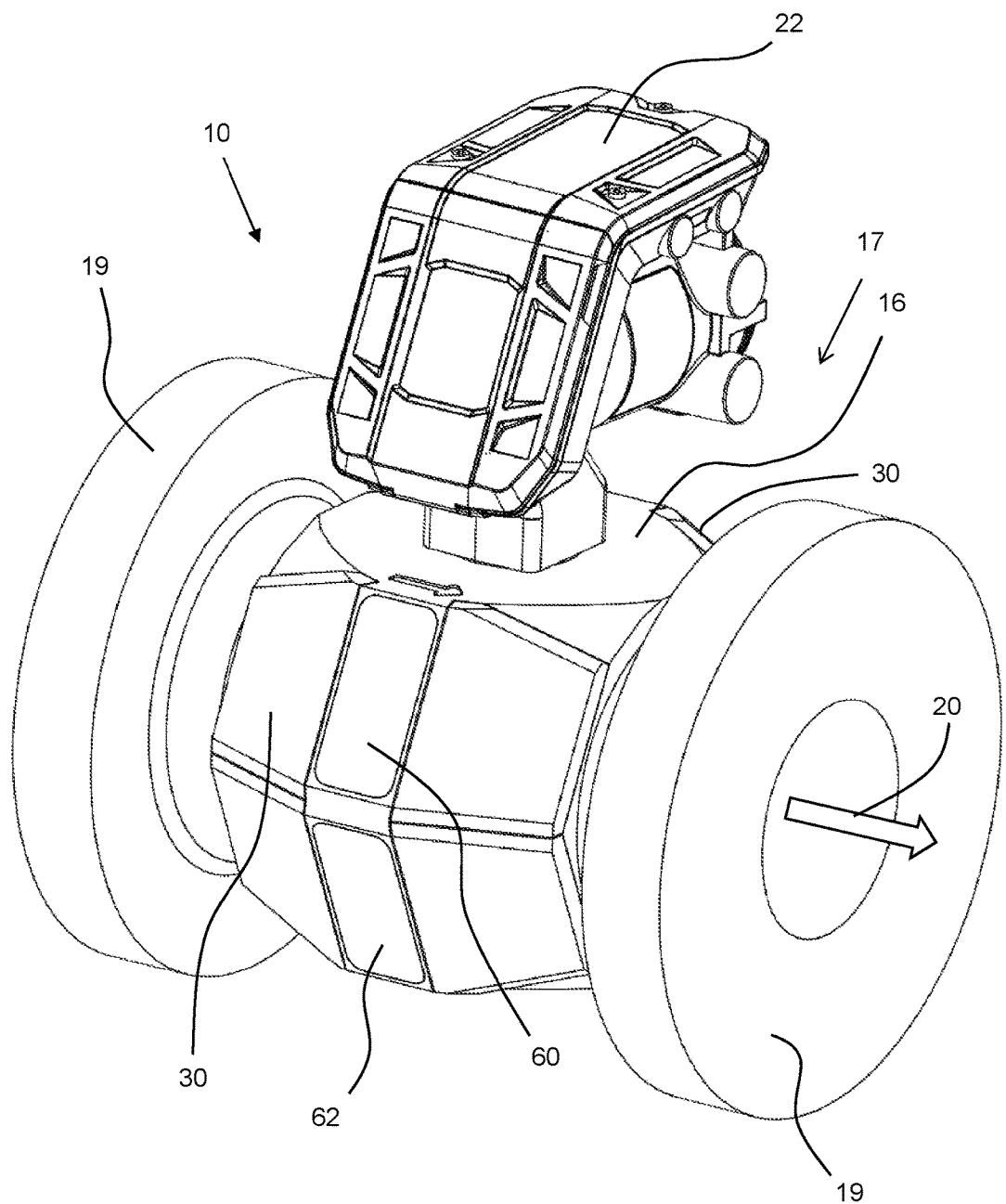
FIG. 2 a perspective view of the meter in accordance with the invention.
Figure 3:
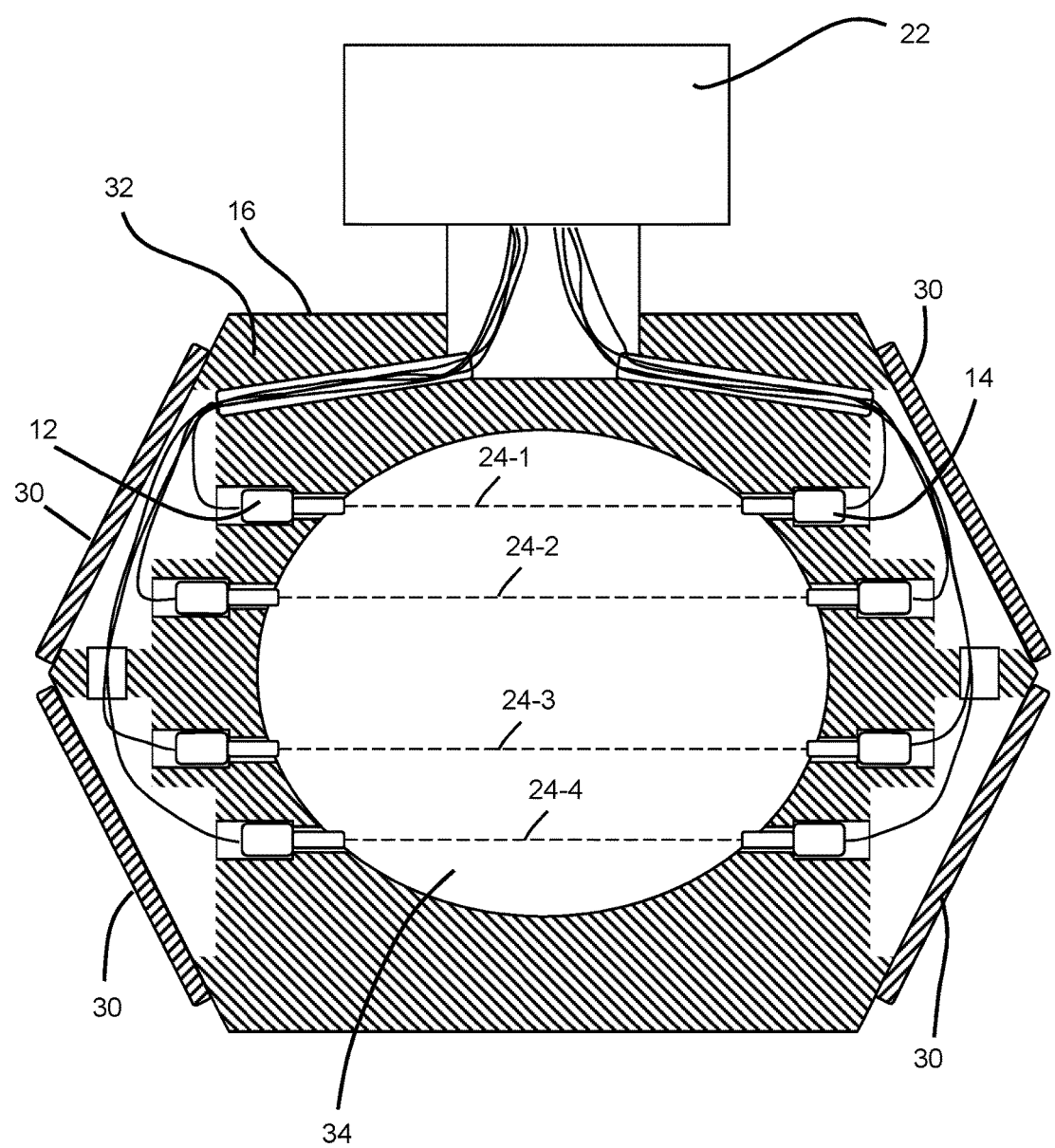
FIG. 3 a schematic sectional representation along the measurement plane.

An embodiment of the meter 10 in accordance with the invention is shown in FIG. 2. The meter has a measurement sensor 17 that has connection flanges 19 for the connection of pipelines for the fluid and the middle piece 16 through which the fluid flows. The ultrasonic transducers 12 and 14 are seated behind cover caps 30 in a wall 32 of the middle piece 16. Since a flow is typically not homogenous over the total cross-section, a single measurement path 24 would only deliver imprecise measurement results and a plurality of measurement paths are therefore provided in a known manner above one another on a cross-section, e.g. four parallel measurement paths 24-1, 24-2, 24-3, 24-4 that are evaluated together, e.g. by averaging. This plurality of measurement paths is shown in the sectional representation of FIG. 3 that schematically shows a section along the measurement plane. Since the measurement plane is disposed at an angle α not equal to 90° with respect to the flow direction, the actually round interior 34 of the middle piece 16 appears as oval in this section.

The actual measurement object, however, does not comprise the determination of the volumetric flow rate, that is the determination of the mass flow, but also the determination of the energy content. It is indispensable for this purpose also to determine the pressure and the temperature of the fluid.

The actual subject of the invention is the arrangement of a pressure sensor 36 in the middle piece 16. The pressure sensor 36 is held in a pressure sensor mount 38 in the wall 32 of the middle piece 16. The pressure sensor mount 38 has a diameter decreasing in size in steps from the outside to the inside. The pressure sensor 36 is sealingly screwed into one of these steps 40.

Figure 4:
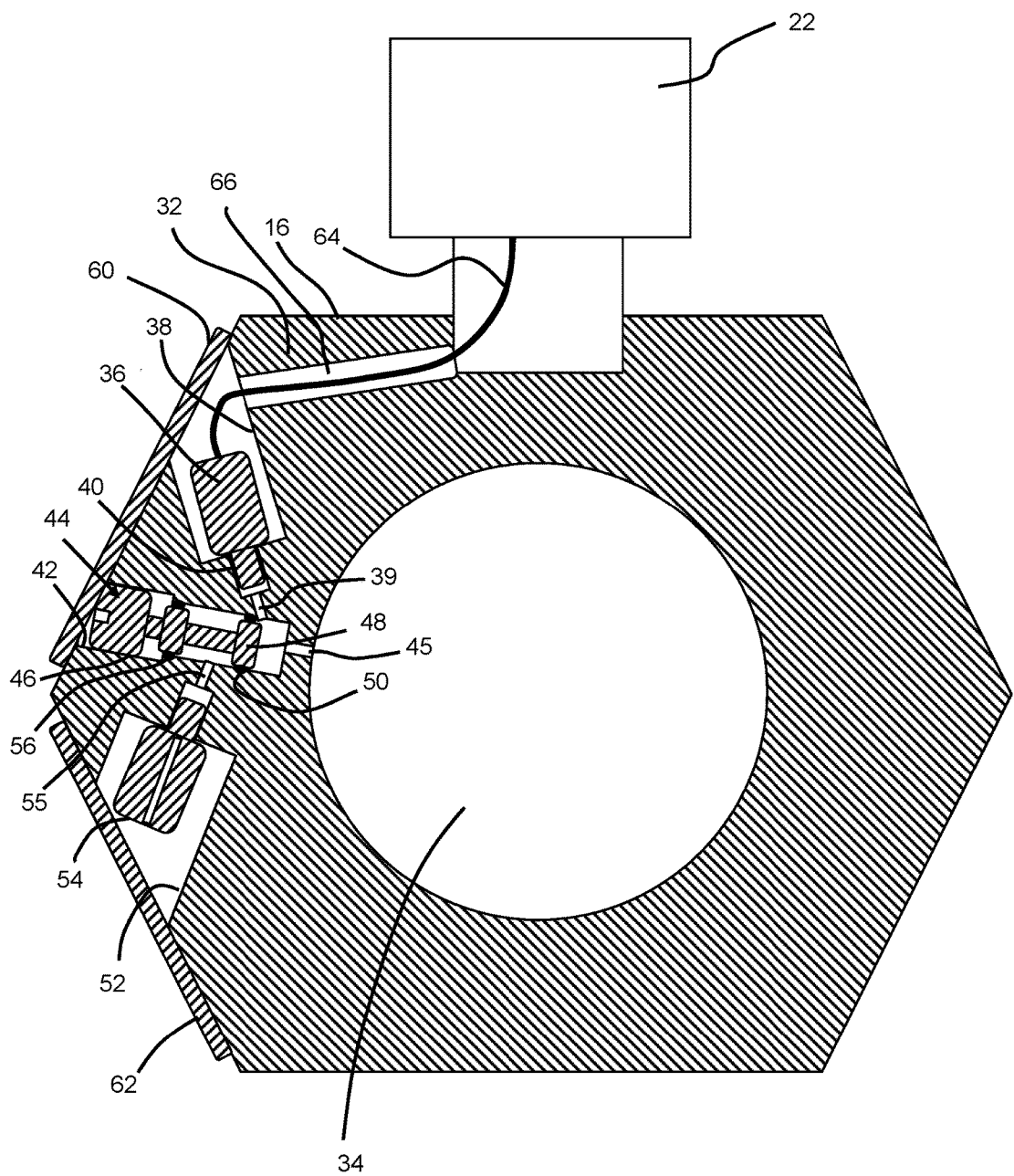
FIGS. 4 and 5 schematic sectional representations in the region of the pressure measurement with different positions of the punch.
Figure 5:
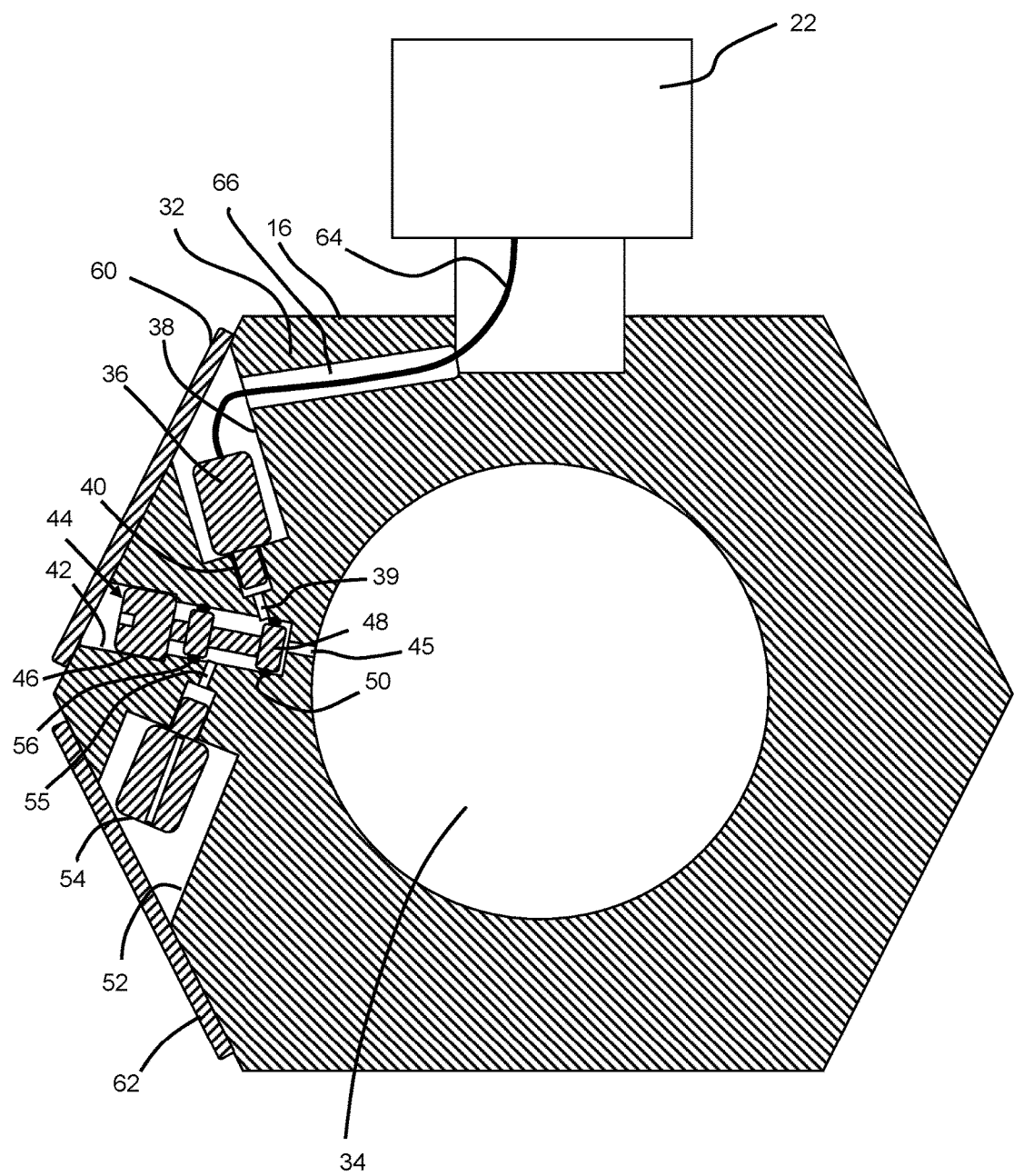

The end of the pressure sensor mount 38 at the interior side opens into a punch mount 42 via a small passage 39. To achieve this in a simple construction, these mounts are arranged at an angle with respect to one another. A punch 44 is arranged in the punch mount 42. The punch mount 42 opens into the interior 34 of the middle piece 16 via a passage 45 and is therefore in fluid communication with the interior 34. The end of the punch 44 at its outer side is screwed into the punch mount via a thread 46 and can therefore be brought by rotation from a first position that is shown in FIG. 4 into a second position that is shown in FIG. 5, or conversely from the second position into the first. The punch is formed as sealing at its end 48 at the front side and disposed toward the interior 34 of the middle piece 16, e.g. by means of a sealing ring 50 contacting the punch mount 42.

A calibration connector mount 52 is furthermore provided in the wall 32 of the middle piece 16 in which wall a calibration connector 54 is received. The calibration connector mount 52 is likewise stepped and the calibration connector 54 is sealingly screwed into one of the steps. The calibration connector mount 52 is arranged at an angle with respect to the punch mount 42 and opens into it via a passage 55 such that there is fluid communication. In this respect, the openings of the calibration connector mount 52 and of the pressure sensor mount 38 are at different punch mount depths, with the opening of the calibration connector mount 52 lying further outward.

The openings and the punch 44 or the first and second positions are dimensioned or positioned such that the pressure sensor 36 is in fluid communication with the interior 34 of the middle piece 16 in the first position, that is the opening of the pressure sensor mount 38 is open toward the interior 34 and the sealing end 48 of the punch 44 closes the punch mount toward the outside (FIG. 4). In the second position, the pressure sensor 36 is in fluid communication with the calibration connector 54 via the punch mount 42. The punch 44 is then screwed in and closes the punch mount 42 toward the interior 34 and simultaneously releases the connection between the opening of the pressure sensor mount 38 and the calibration connector mount 52. So that no environmental air can penetrate into this connection, the punch 46 is also sealed by a sealing ring 56 at its outwardly disposed end.

The three mounts 38, 42 and 52 can be covered by cover caps 60 and 62. In order to still allow an electrical connection of the pressure sensor 36 to the evaluation unit 22 despite the cover cap, connection lines 64 are conducted through corresponding bores 66 through the wall 32 of the middle piece 16.

In a further development of the invention, temperature sensors not shown in the drawing can be held in the same way in the middle piece 16 in temperature sensor mounts, for example on the side opposite the pressure sensor 36, to detect the temperature of the fluid. The temperature sensor mounts can likewise be coverable by cover caps and electrical connections can in turn be conducted through the wall 32 to the evaluation unit 22.

The invention claimed is:

1. An ultrasonic flowmeter for measuring the flow speed and/or the volumetric flow rate of a fluid, the ultrasonic flowmeter having
    a measurement sensor that has connection flanges for the connection of pipelines for the fluid and that has a middle piece through which the fluid flows;
    at least two ultrasonic transducers that are received in the middle piece, that form an ultrasonic transducer pair and that span a measurement path between them that passes through the flow;
    a pressure sensor that is held in a pressure sensor mount in the middle piece and that is in fluid communication with the interior of the middle piece via a punch mount;
    a calibration connector that is held in the middle piece in a calibration connector mount and that is in fluid communication with the interior of the middle piece via the punch mount,
    wherein a punch can be brought into two positions in the punch mount and the pressure sensor is in fluid communication with the interior of the middle piece in a first position;
    and wherein the pressure sensor is in fluid communication with the calibration connector via the punch mount in a second position.

2. The meter in accordance with claim 1, wherein the punch is configured to be brought from the first position into the second position and vice versa by rotation.

3. The meter in accordance with claim 1, wherein longitudinal directions of the pressure sensor mount, of the calibration connector mount, and of the punch mount are aligned at angles with respect to one another such that the pressure sensor mount and the calibration connector mount open into the punch mount and the punch mount opens into the interior of the middle piece.

4. The meter in accordance with claim 3, wherein the openings of the pressure sensor mount and the calibration connector mount are disposed at different punch mount depths and the opening of the pressure sensor mount is disposed closer toward the interior and the punch is formed as sealing with respect to the punch mount at its end at the front side and disposed toward the interior of the middle piece.

5. The meter in accordance with claim 3, wherein the punch is screwed into the middle piece by rotation toward the interior from the first position to the second position via a thread.

6. The meter in accordance with claim 1, wherein the pressure sensor mount, the calibration connector mount, and the punch mount are coverable by cover caps.

7. The meter in accordance with claim 1, further comprising an evaluation unit, with the evaluation unit being arranged at the middle piece and being electrically connected to the pressure sensor via connection lines; and with the connection lines being conducted through corresponding bores through the wall of the middle pieces.

8. The meter in accordance with claim 1, wherein a temperature sensor is held in a temperature sensor mount in the middle piece to detect the temperature of the fluid and the temperature sensor mount is coverable by a cover cap.

* * * * *